(12) United States Patent
Liu et al.

(10) Patent No.: US 10,171,522 B1
(45) Date of Patent: Jan. 1, 2019

(54) VIDEO COMMENTARY

(75) Inventors: Sean Liu, Sunnyvale, CA (US); Nikhyl Singhal, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 1658 days.

(21) Appl. No.: 13/350,121

(22) Filed: Jan. 13, 2012

(51) Int. Cl.
*G06F 15/16* (2006.01)
*H04L 29/06* (2006.01)
*G06F 17/30* (2006.01)
*H04N 21/472* (2011.01)

(52) U.S. Cl.
CPC .... *H04L 65/4007* (2013.01); *G06F 17/30873* (2013.01); *H04N 21/47202* (2013.01)

(58) Field of Classification Search
CPC ......... H04N 21/47202; H04N 7/17318; H04N 21/233; H04L 65/4007; G06F 17/30873; G06Q 10/10
USPC .............................. 386/230; 725/13; 709/204
See application file for complete search history.

(56) References Cited

U.S. PATENT DOCUMENTS

| | | | | | |
|---|---|---|---|---|---|
| 5,886,735 | A | * | 3/1999 | Bullister | 348/14.16 |
| 7,200,857 | B1 | * | 4/2007 | Rodriguez et al. | 725/87 |
| 8,064,894 | B1 | * | 11/2011 | Bill | G06Q 10/10 370/395.3 |
| 8,073,915 | B1 | * | 12/2011 | Nandy | 709/206 |
| 8,375,331 | B1 | * | 2/2013 | Mayers | 715/835 |
| 8,438,598 | B2 | * | 5/2013 | Sakai et al. | 725/46 |
| 2007/0070186 | A1 | * | 3/2007 | Fujimori | H04N 7/147 348/14.03 |
| 2007/0261071 | A1 | * | 11/2007 | Lunt | G06Q 10/10 725/13 |
| 2008/0154908 | A1 | * | 6/2008 | Datar | G06F 17/241 |
| 2009/0007200 | A1 | * | 1/2009 | Amento et al. | 725/100 |
| 2009/0089294 | A1 | * | 4/2009 | Davis | H04N 7/17318 |
| 2009/0100456 | A1 | * | 4/2009 | Hughes | H04N 7/173 725/14 |
| 2009/0148124 | A1 | * | 6/2009 | Athsani | G06Q 30/02 386/241 |
| 2009/0158369 | A1 | * | 6/2009 | Van Vleck | H04N 21/8456 725/110 |

(Continued)

OTHER PUBLICATIONS http://news.3yen.com/wp-content/images/kill-japanese-text.jpg., downloaded Jan. 12, 2012, pp. 1.

(Continued)

*Primary Examiner* — SM A Rahman
(74) *Attorney, Agent, or Firm* — IP Spring (57) ABSTRACT

A method, computer program product, and system for video commentary is described. A method may comprise providing particular media content to two or more user computing devices. The method may further comprise receiving, from a first user computing device of the two or more user computing devices, a selection to view comments from a second user computing device of the two or more user computing devices. The method may also comprise receiving one or more comments from the second user computing device of the two or more user computing devices. The one or more comments from the second user computing device may be associated with video media content. The method may additionally comprise transmitting the one or more comments from the second user computing device to the first user computing device based upon, at least in part, the selection from the first user computing device to view the comments.

24 Claims, 5 Drawing Sheets

(56) References Cited

U.S. PATENT DOCUMENTS

| | | | |
|---|---|---|---|
| 2009/0164904 A1* | 6/2009 | Horowitz | G06F 17/30817 715/723 |
| 2009/0199249 A1* | 8/2009 | Rodriguez et al. | 725/91 |
| 2009/0288110 A1* | 11/2009 | Logan et al. | 725/24 |
| 2009/0289779 A1* | 11/2009 | Braun | G06F 3/016 340/407.2 |
| 2009/0327100 A1* | 12/2009 | Greenberg | G06F 3/0481 705/26.1 |
| 2010/0002066 A1* | 1/2010 | Nelson | G11B 27/034 348/14.1 |
| 2010/0011023 A1* | 1/2010 | Nakaoka | 707/104.1 |
| 2010/0023879 A1* | 1/2010 | Finn | A63F 13/12 715/757 |
| 2010/0122174 A1* | 5/2010 | Snibbe | G06Q 10/10 715/733 |
| 2010/0241507 A1* | 9/2010 | Quinn | G06Q 30/02 705/14.42 |
| 2010/0318913 A1* | 12/2010 | Cupala | G06F 3/0481 715/719 |
| 2011/0145880 A1* | 6/2011 | Wang | 725/117 |
| 2011/0252359 A1* | 10/2011 | England | G06F 9/4443 715/781 |
| 2012/0082427 A1* | 4/2012 | Andres Del Valle et al. | 386/230 |
| 2012/0150698 A1* | 6/2012 | McClements, IV | 705/27.2 |
| 2012/0300066 A1* | 11/2012 | Park | 348/143 |
| 2012/0311618 A1* | 12/2012 | Blaxland | 725/9 |
| 2012/0316896 A1* | 12/2012 | Rahman | G06F 19/3418 705/3 |
| 2012/0321271 A1* | 12/2012 | Baldwin et al. | 386/201 |
| 2013/0004138 A1* | 1/2013 | Kilar et al. | 386/230 |
| 2013/0013089 A1* | 1/2013 | Kawakami et al. | 700/90 |
| 2013/0031487 A1* | 1/2013 | Olsen et al. | 715/751 |
| 2013/0086159 A1* | 4/2013 | Gharachorloo et al. | 709/204 |
| 2014/0164382 A1* | 6/2014 | Keebler | G06F 17/30893 707/737 |

OTHER PUBLICATIONS http://blog.btrax.com/wp-content/uploads/2008/04/niconico.jp., downloaded Jan. 12, 2012, pp. 1.

* cited by examiner

VIDEO COMMENTARY

TECHNICAL FIELD

The technical field may generally relate to video commentary, and more particularly to viewing video commentary.

BACKGROUND

Video (e.g., shows, movies, and/or news clips) may be shared online. Multiple users may watch a video at the same or similar time. Also, the users may watch the same video at different times. For example, a user may watch a video over the internet with one or more other users in different locations. For example, the user may watch the video with the one or more other users over a video streaming or broadcasting application. Further, the user may watch the video with the one or more other users over a social networking application. The video streaming or broadcasting application or the social networking application may allow the users in different locations to watch the same video at their own viewing device (e.g., a computer and/or mobile phone).

BRIEF SUMMARY

In an embodiment, a method for handling media content comments may execute on one or more computing devices. The method may include providing, from the one or more computing devices, particular media content to two or more user computing devices. The method may further include receiving, at the one or more computing devices, from a first user computing device of the two or more user computing devices, a selection to view comments from a second user computing device of the two or more user computing devices. The method may also include receiving, at the one or more computing devices, one or more comments from the second user computing device of the two or more user computing devices. The one or more comments from the second user computing device may be associated with video media content. The method may additionally include transmitting, via the one or more computing devices, the one or more comments from the second user computing device to the first user computing device based upon, at least in part, the selection from the first user computing device to view the comments from the second user computing device.

One or more of the following features may be included. The method may include restricting comments viewable with the video media content at the first user computing device of the two or more user computing devices to the one or more comments received from the second user computing device of the two or more user computing devices. Transmitting the one or more comments from the second user computing device to the first user computing device may include transmitting the one or more comments to the first user computing device with the video media content. The method may also include overlaying the one or more comments from the second user computing device on the video media content. The one or more computing devices may execute a social networking application. The first user computing device and the second user computing device may have been authenticated by the social networking application.

In an implementation, an option to view the comments from the second user computing device of the two or more user computing devices may be selectable via, at least in part, a social networking application. The first user computing device may be associated with a first user in a social network. The second user computing device may be associated with a second user in the social network. The selection to view the comments from the second user computing device of the two or more user computing devices may be a selection of a second user associated with the second user computing device. The second user may be within an adjustable social network proximity in relation to a first user associated with the first user computing device. The selection to view the comments from the second user computing device of the two or more user computing devices may be a selection of a second user associated with the second user computing device. The second user computing device may be in an adjustable physical proximity in relation to the first user computing device.

In an implementation, the method may include receiving a selection to not view comments from a third user computing device of the two or more user computing devices. The method may also include preventing transmission of one or more comments from the third user computing device to the first user computing device based upon, at least in part, the selection not to view the comments from the third user computing device.

In an embodiment, a computer program product may reside on a computer readable storage medium and may have a plurality of instructions stored on it. When executed by a processor, the instructions may cause the processor to perform operations including providing, from the one or more computing devices, particular media content to two or more user computing devices. The operations may further include receiving, at the one or more computing devices, from a first user computing device of the two or more user computing devices, a selection to view comments from a second user computing device of the two or more user computing devices. The operations may also include receiving, at the one or more computing devices, one or more comments from the second user computing device of the two or more user computing devices. The one or more comments from the second user computing device may be associated with video media content. The operations may additionally include transmitting, via the one or more computing devices, the one or more comments from the second user computing device to the first user computing device based upon, at least in part, the selection from the first user computing device to view the comments from the second user computing device.

One or more of the following features may be included. The operations may include restricting comments viewable with the video media content at the first user computing device of the two or more user computing devices to the one or more comments received from the second user computing device of the two or more user computing devices. Transmitting the one or more comments from the second user computing device to the first user computing device may include transmitting the one or more comments to the first user computing device with the video media content. The operations may also include overlaying the one or more comments from the second user computing device on the video media content. The one or more computing devices may execute a social networking application. The first user computing device and the second user computing device may have been authenticated by the social networking application.

In an implementation, an option to view the comments from the second user computing device of the two or more user computing devices may be selectable via, at least in part, a social networking application. The first user computing device may be associated with a first user in a social network. The second user computing device may be associated with a second user in the social network. The selection to view the comments from the second user computing device of the two or more user computing devices may be a selection of a second user associated with the second user computing device. The second user may be within an adjustable social network proximity in relation to a first user associated with the first user computing device. The selection to view the comments from the second user computing device of the two or more user computing devices may be a selection of a second user associated with the second user computing device. The second user computing device may be in an adjustable physical proximity in relation to the first user computing device.

In an implementation, the operations may include receiving a selection to not view comments from a third user computing device of the two or more user computing devices. The operations may also include preventing transmission of one or more comments from the third user computing device to the first user computing device based upon, at least in part, the selection not to view the comments from the third user computing device.

In an embodiment, a computing system may include one or more processors. The one or more processors may be configured to provide, from the one or more computing devices, particular media content to two or more user computing devices. The one or more processors may be further configured to receive, at the one or more computing devices, from a first user computing device of the two or more user computing devices, a selection to view comments from a second user computing device of the two or more user computing devices. The one or more processors may also be configured to receive, at the one or more computing devices, one or more comments from the second user computing device of the two or more user computing devices. The one or more comments from the second user computing device may be associated with video media content. The one or more processors may additionally be configured to transmit, via the one or more computing devices, the one or more comments from the second user computing device to the first user computing device based upon, at least in part, the selection from the first user computing device to view the comments from the second user computing device.

One or more of the following features may be included. The one or more processors may be further configured to restrict comments viewable with the video media content at the first user computing device of the two or more user computing devices to the one or more comments received from the second user computing device of the two or more user computing devices. The one or more processors may also be configured to transmit the one or more comments to the first user computing device with the video media content. The one or more processors may additionally be configured to overlay the one or more comments from the second user computing device on the video media content. The one or more computing devices may execute a social networking application. The first user computing device and the second user computing device may have been authenticated by the social networking application.

In an implementation, an option to view the comments from the second user computing device of the two or more user computing devices may be selectable via, at least in part, a social networking application. The first user computing device may be associated with a first user in a social network. The second user computing device may be associated with a second user in the social network. The selection to view the comments from the second user computing device of the two or more user computing devices may be a selection of a second user associated with the second user computing device. The second user may be within an adjustable social network proximity in relation to a first user associated with the first user computing device. The selection to view the comments from the second user computing device of the two or more user computing devices may be a selection of a second user associated with the second user computing device. The second user computing device may be in an adjustable physical proximity in relation to the first user computing device.

In an implementation, the one or more processors may be configured to receive a selection to not view comments from a third user computing device of the two or more user computing devices. The one or more processors may also be configured to prevent transmission of one or more comments from the third user computing device to the first user computing device based upon, at least in part, the selection not to view the comments from the third user computing device.

In an embodiment, a method for displaying media content comments may execute on one or more computing devices. The method may include receiving, at a first computing device of two or more user computing devices, particular media content. The method may further include receiving, at the first computing device of the two or more computing devices, a selection to view comments from a second user computing device of the two or more user computing devices. The method may also include receiving, at the first computing device of the two or more user computing devices, one or more comments from the second user computing device of the two or more user computing devices based upon, at least in part, the selection from the first user computing device to view the comments from the second user computing device. The one or more comments from the second user computing device may be associated with video media content. The method may additionally include displaying, at the first computing device of the two or more user computing devices, the one or more comments from the second user computing device over the video media content as the video media content is rendered.

The details of one or more implementations are set forth in the accompanying drawings and the description below. Other features and advantages will become apparent from the description, the drawings, and the claims.

DETAILED DESCRIPTION

Overview

Users in different locations may watch the same video at their own viewing device (e.g., a computer and/or mobile phone). For example, the users may watch the video over a video streaming or broadcasting application, or over a social networking application. Some users may enter comments about the video over their viewing device. For example, a user may enter comments about the video over one or more of client electronic devices 28, 30, 32, and 34.

The comments of each user may be overlaid on top of the video such that the comments are viewable to each user at their respective viewing device. As multiple users may enter comments, there may be too many comments for a given user to read. Further, the user may not wish to see comments from everyone watching the video.

The user may select certain users or groups of users whose comments the user is interested in. For example, the user may select certain users or groups of users in his or her social network whose comments the user is interested in. Comments of the selected users may be overlaid on top of the video for the user to view, while comments of unselected users may not appear. Different users in a social network watching the same video may have comments from different sets of users overlaid on the video.

Figure 1:
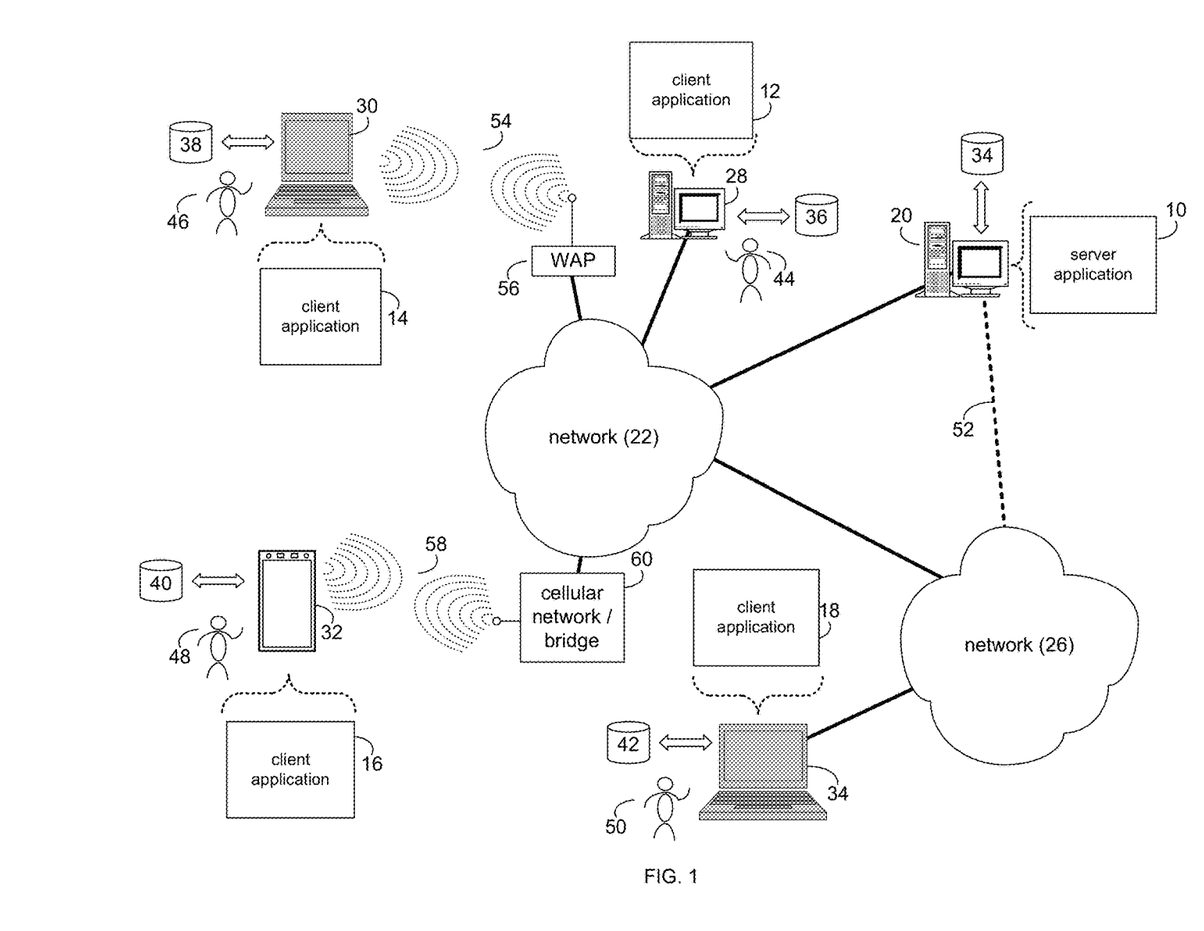
FIG. 1 depicts an example system that can execute implementations of the present disclosure.
Figure 2:
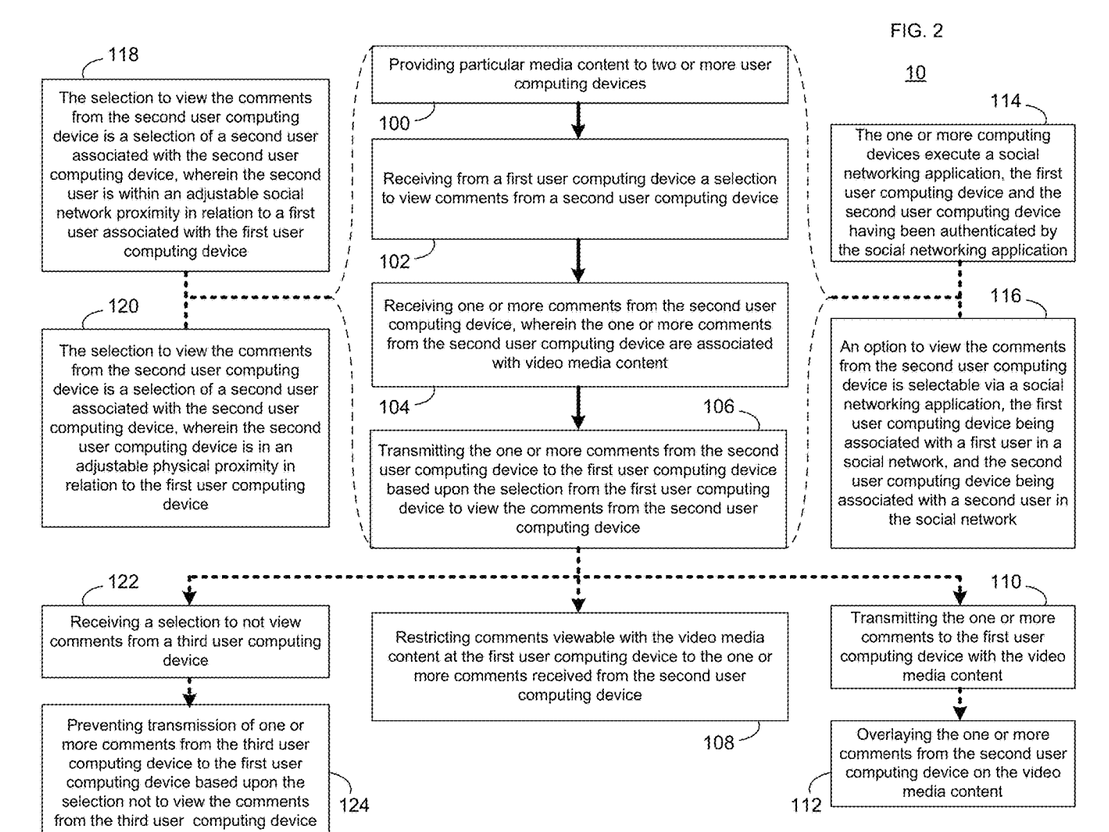
FIG. 2 is a flowchart illustrating an example process for video commentary in accordance with the present disclosure.

Referring to FIGS. 1 & 2, there is shown a server application 10 and client applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as video commentary process 10. Further, one or more of client applications 12, 14, 16, and 18 may be referred to as a process configured to carry out one or more of the features described herein, such as video commentary processes 12, 14, 16, and/or 18.

As will be discussed below, video commentary process 10 may provide 100, particular media content to two or more user computing devices. Video commentary process 10 may also receive 102, from a first user computing device of the two or more user computing devices, a selection to view comments from a second user computing device of the two or more user computing devices. Video commentary process 10 may further receive 104 one or more comments from the second user computing device of the two or more user computing devices. The one or more comments from the second user computing device may be associated with video media content. Video commentary process 10 may additionally transmit 106 the one or more comments from the second user computing device to the first user computing device based upon, at least in part, the selection from the first user computing device to view the comments from the second user computing device.

The video commentary (VC) process may be a server-side process (e.g., server-side VC process 10), a client-side process (e.g., client-side VC process 12, client-side VC process 14, client-side VC process 16, or client-side VC process 18), or a hybrid server-side / client-side process (e.g., a combination of server-side VC process 10 and one or more of client-side VC processes 12, 14, 16, 18).

System Overview

Referring to FIG. 1, Server-side VC process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and / or serially. Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side VC process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side VC processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side VC processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side VC processes 12, 14, 16, 18 and/or server-side VC process 10 may be processes that run within (i.e., are part of) a video streaming or broadcasting application or a social networking application. Alternatively, client-side VC processes 12, 14, 16, 18 and/or server-side VC process 10 may be stand-alone applications that work in conjunction with the video streaming or broadcasting application or the social networking application. One or more of client-side VC processes 12, 14, 16, 18 and server-side VC process 10 may interface with each other (via network 22 and/or network 26).

Users 44, 46, 48, 50 may access server-side VC process 10 directly through the device on which the client-side VC process (e.g., client-side VC processes 12, 14, 16, 18) is executed, namely client electronic devices 28, 30, 32, 34, for example. Users 44, 46, 48, 50 may access server-side VC process 10 directly through network 22 and/or through secondary network 26. Further, server computer 20 (i.e., the computer that executes server-side VC process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network / bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Video Commentary (VC) Process

For the following discussion, server-side VC process 10 will be described for illustrative purposes. It should be noted that server-side VC process 10 may interact with client-side VC process 12 and may be executed within one or more applications that allow for communication with client-side VC process 12. However, this is not intended to be a limitation of this disclosure, as other configurations are possible (e.g., stand-alone, client-side VC processes and/or stand-alone server-side VC processes). For example, some implementations may include one or more of client-side VC processes 12, 14, 16, 18 in place of or in addition to server-side VC process 10.

Figure 3:
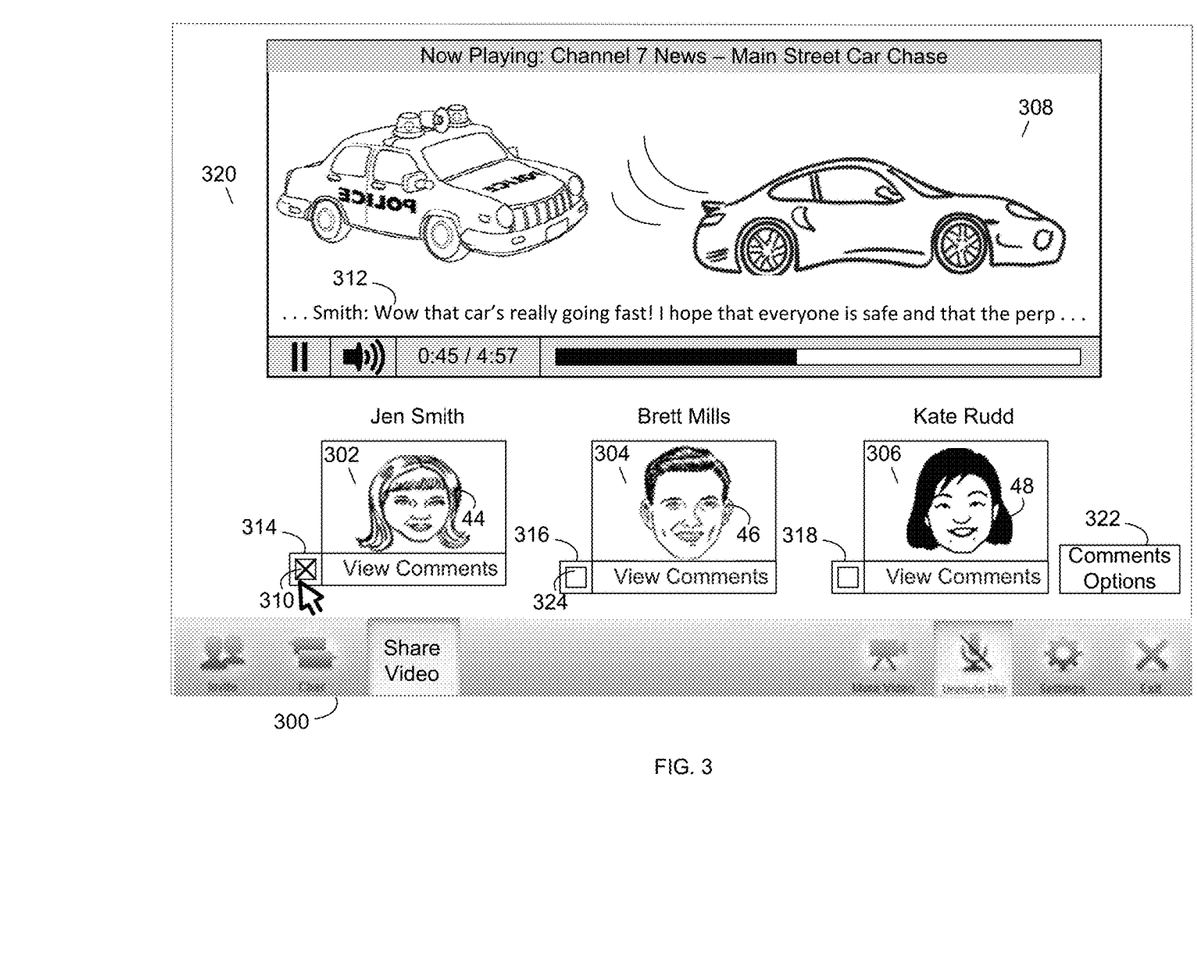
FIG. 3 depicts an example graphical user interface of one or more implementations of the present disclosure.

Referring now to FIGS. 1-3, one or more of users 44, 46, and 48 may be participants in a video chat. Referring now to FIG. 3, user 44 may be "Jen Smith", user 46 may be "Brett Mills", and user 48 may be "Kate Rudd". The video chat may be conducted over a video streaming or broadcasting application or a social networking application (e.g., application 300). The video streaming or broadcasting application or social networking application may be configured for one or more of internet protocol (IP) telephony, voice-over IP conferencing and/or video conferencing.

One or more of users 44, 46, and 48 may be associated with and/or utilize one or more of client electronic devices 28, 30, and 32. Video media content 302, 304, and 306 may be captured by a web camera or other video camera (not shown) that is in communication with one or more of client electronic devices 28, 30, and/or 32. The web camera or other video camera may be focused on one or more of users 44, 46, and 48. One or more of server computer 20 and client electronic devices 28, 30, and 32 may be configured with one or more web cameras or other video cameras and application 300 to allow one or more of users 44, 46, and 48 to participate in a video chat while viewing video media content 308, as shown in FIG. 3.

Video media content 308 may be a show, movie, and/or news clip being viewed by users 44, 46, and/or 48. For example, video media content 308 may be streamed from server computer 20 to client electronic devices 28, 30, and/or 32 via application 300 such that users 44, 46, and/or 48 may view video media content 308 together.

For example, user 44 may be associated with client electronic device 28. A web camera or other video camera in communication with client electronic device 28 may be focused on user 44 and/or a background of user 44. The web camera or other video camera in communication with client electronic device 28 may capture one or more images of user 44 and/or a background of user 44, which may be referred to as video media content 302. Application 300 may be configured to allow one or more of users 44, 46, and 48 to view video media content 302 via one or more of client electronic devices 28, 30, and/or 32.

User 46 may be associated with client electronic device 30. A web camera or other video camera in communication with client electronic device 30 may be focused on user 46 and/or a background of user 46. The web camera or other video camera in communication with client electronic device 30 may capture one or more images of user 46 and/or a background of user 46, which may be referred to as video media content 304. Application 300 may be configured to allow one or more of users 44, 46, and 48 to view video media content 304 via one or more of client electronic devices 28, 30, and/or 32.

User 48 may be associated with client electronic device 32. A web camera or other video camera in communication with client electronic device 32 may be focused on user 48 and/or a background of user 48. The web camera or other video camera in communication with client electronic device 32 may capture one or more images of user 48 and/or a background of user 48, which may be referred to as video media content 306. Application 300 may be configured to allow one or more of users 44, 46, and 48 to view video media content 306 via one or more of client electronic devices 28, 30, and/or 32.

Video media content 302, 304, 306, and 308 may be digital data streams, analog signals, and/or digital signals. Video media content 302, 304, 306, and 308 may be encoded for transmission from one device to another and decoded for playback. Video media content 302, 304, 306, and 308 may each be shown in decoded playback form.

While FIG. 3 shows application 300 as allowing users 44, 46, and 48 to view video media content 308 while also viewing video media content 302, 304, and 306 in a video chat, this is for illustrative purposes only. For example users 44, 46, and 48 may view video media content 308 over application 300 without being in a video chat (e.g., without viewing video media content 302, 304, and 306). Users 44, 46, and 48 may view video media content 308 at the same time, near the same time, or at different times, over application 300 without being in the video chat.

Further, other users may view video media content 308 at or near the same time, or at different times than users 44, 46, and 48 without being in the video chat. For example, user 50 may view video media content 308 via client electronic device 34 without being in the video chat.

In an example, users 44, 46, 48, and 50 may use application 300 (e.g., a social networking application). Users 44, 46, 48, and 50 may view video media content 308 via application 300. For example, user 50 may view video media content 302, 304, 306, and 308 through GUI 320, which may allow user 50 to interact with application 300.

One or more of users 44, 46, and/or 48 viewing video media content 308 may wish to make comments about video media content 308. Further, one or more users (e.g., user 50) that may or may not be in the video chat but nonetheless may be viewing video media content 308 and may wish to make comments about video media content 308. One or more of users 44, 46, 48, and/or 50 may, for example, type (or otherwise enter) comments about video media content 308 via one or more of client electronic devices 28, 30, 32, and/or 34. The comments may be entered into application 300 through which one or more of users 44, 46, 48, and/or 50 may view video media content 308.

Also, one or more of users 44, 46, 48, and/or 50 may wish for the other users to view their comments. Additionally, one or more of users 44, 46, 48, and/or 50 may wish to view some or all of the comments entered by the other users. Users 44, 46, 48, and/or 50 may wish to view the comments over the video media content, in or near real time, as they are made by some or all of the other users.

VC process 10 may provide 100 particular media content (e.g., video media content 308) to two or more user computing devices (e.g., client electronic devices 28, 30, 32, and/or 34). Video media content 308 may be provided 100 from server computer 20 to client electronic devices 28, 30, 32, and/or 34. As discussed above, video media content 308 may be a digital data stream, analog signal, and/or digital signal. Video media content 308 may be encoded for transmission from one device (e.g., server computer 20) to another (e.g., client electronic devices 28, 30, 32, and/or 34) and decoded for playback. Video media content 308 may be shown in FIG. 3 in decoded playback form. Video media content 308 may be a show, movie, news clip, or any other type of streamable video.

Assume for illustrative purposes that user 50 views graphical user interface (GUI) 320 at client electronic device 34. GUI 320 may be available from application 300 and may allow user 50 to view video media content 302, 304, 306, and 308.

Figure 4:
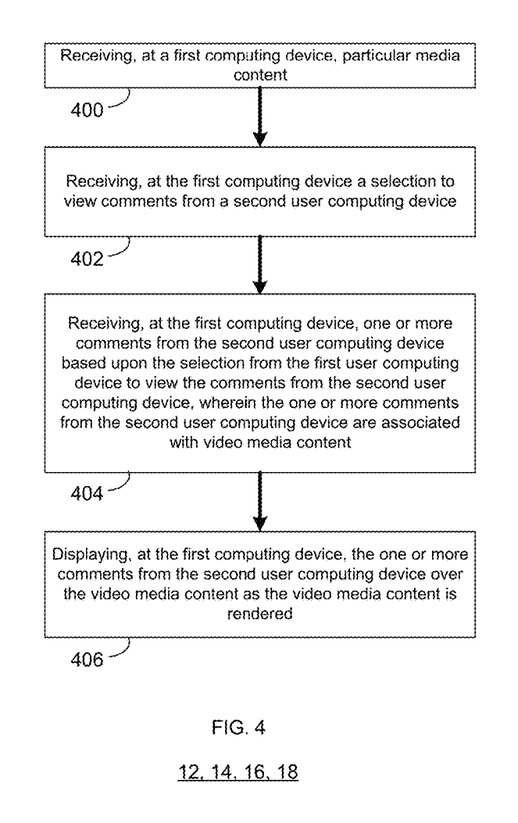
FIG. 4 is a flowchart illustrating an example process for video commentary in accordance with the present disclosure.

Referring now also to FIG. 4, in an implementation, one or more of VC processes 12, 14, 16, and/or 18 may receive 400 the particular media content (e.g., video media content 308) at one or more of client electronic devices 28, 30, 32, and/or 34, respectively. For example, VC process 18 may receive 400 video media content 308 at client electronic device 34.

VC process 10 may receive 102 a selection (e.g., selection 310) to view comments (e.g., comments 312) from a second user computing device (e.g., client electronic device 28 associated with user 44). Selection 310 may be received 102 from a first computing device (e.g., client electronic device 34 associated with user 50).

Selection 310 may have been made by, e.g., user 50, in response to user 50 selecting one or more of checkboxes 314, 316, and/or 318 in GUI 320. Selection 310 may be a selection by user 50 to view comments from a second user (e.g., user 44).

For example, and referring now to FIG. 4, VC process 18 may receive 402, at client electronic device 34, selection 310 (which may have been made by user 50) to view comments 312 from client electronic device 28 associated with user 44.

Selection 310 may be received 102 at server computer 20 from client electronic device 34 associated with user 50. Further, selection 310 may enable user 50 to view comments from user 44 about video media content 308.

Further, VC process 10 may receive 104, one or more comments (e.g., comments 312) from the second user computing device (e.g., client electronic device 28). Comments 312 may be received 104 at server computer 20. Comments 312 from, e.g., client electronic device 28, may be associated with video media content 308.

For example, comments 312 may have been entered by user 44 into client electronic device 28 while user 44 was viewing video media content 308. User 44 may have entered comments 312 into client electronic device 28 over a keyboard, for example. Comments 312 may reflect one or more thoughts of user 44 regarding video media content 308.

VC process 10 may transmit 106, the one or more comments (e.g., comments 312) from the second user computing device (e.g., client electronic device 28 associated with user 44) to the first user computing device (e.g., client electronic device 34 associated with user 50). Comments 312 may be transmitted 106 to client electronic device 34 associated with user 50 via server computer 20. Further, comments 312 may be transmitted 106 based upon, at least in part, selection 310 from the first user computing device (e.g., client electronic device 34 associated with user 50) to view comments 312 from the second user computing device (e.g., client electronic device 28 associated with user 44).

In some embodiments, VC process 10 may restrict 108 comments (e.g., comments 312) viewable with the video media content (e.g., video media content 308) at the first user computing device (e.g., client electronic device 34 associated with user 50). For example the comments viewable with video media content 308 at client electronic device 34 associated with user 50 may be restricted 108 to the one or more comments (e.g., comments 312) received from the second user computing device (e.g., client electronic device 28 associated with user 44). This may be based upon, at least in part, selection 310 of, e.g., user 50.

In some embodiments, VC process 10 may transmit 110 the one or more comments (e.g., comments 312) to the first user computing device (e.g., client electronic device 34 associated with user 50) with the video media content (e.g., video media content 308). For example, comments 312 may be sent with the digital data stream, analog signal, and/or digital signal that may makeup video media content 308. Comments 312 may be embedded with the digital data stream, analog signal, and/or digital signal that may makeup video media content 308 prior to transmission to client electronic device 34 associated with user 50. This may be based upon, at least in part, selection 310 of, e.g., user 50.

Referring also to FIG. 4, VC process 18 may receive 404 comments 312 from client electronic device 28 associated with user 44. Comments 312 may be received 404 at client electronic device 34 associated with user 50. Comments 312 may be received 404 based upon, at least in part, selection 310 from client electronic device 34 associated with user 50 to view the comments from client electronic device 28 associated with user 44. Comments 312 from client electronic device 28 may be associated with video media content 308.

In some embodiments, VC process 10 may overlay 112 the one or more comments (e.g., comments 312) from the second user computing device (e.g., client electronic device 28 associated with user 44) on the video media content (e.g., video media content 308). As shown in FIG. 3, comments 312 may be overlaid 112 on video media content 308 such that comments 312 may be viewable over video media content 308. For example, comments 312 may appear at the bottom of video media content 308 and may move from right to left as video media content 308 is played in GUI 320.

Comments 312 may be overlaid 112 on video media content 308 using a number of techniques and features. For example, closed captioning technology may be used, at least in part to overlay 112 comments 312 on video media content 308. Comments 312 may also be overlaid 112 using, at least in part, a Distribution Exchange profile (DFXP) of a W3C Timed Text format. Further, comments 312 maybe overlaid 112 on video media content 308 by utilizing, at least in part, one or more captioning features available in one or more online media players (e.g., Flash™, Silverlight Media Framework™, and/or QuickTime™). A combination of one or more of the captioning technologies and features described above, as well as other captioning technologies and features, may be used to overlay 112 comments 312 on video media content 308 as described herein.

Referring also to FIG. 4, VC process 18 may display 406 the one or more comments (e.g., comments 312) from the second user computing device (e.g., client electronic device 28 associated with user 44) over the video media content (e.g., video media content 308). Comments 312 may be displayed 406 as video media content 308 is rendered. Comments 312 may be displayed 406 at the first computing device (e.g., client electronic device 34 associated with user 50).

In some embodiments, one or more of server computer 20 and/or client electronic devices 28, 30, 32, and 34 may execute a social networking application (e.g., application 300). One or more of client electronic devices 28, 30, 32, and 34 may have been authenticated (114) by the social networking application (e.g., application 300).

For example, client electronic device 34 associated with user 50 and/or client electronic device 28 associated with user 44 may have been authenticated (114) by the social networking application (e.g., application 300). The social networking application may require a username and/or password to be entered in order for client electronic device 34 associated with user 50 and/or client electronic device 28 associated with user 44 to be authenticated.

In some embodiments, an option (e.g., via checkboxes 314, 316, and/or 318) to view comments (e.g., comments 312) may be selectable (116) via, at least in part, the social networking application (e.g., application 300). For example an option (e.g., via checkbox 314) to view comments 312 (e.g. by user 44) from client electronic device 28 associated with user 44 may be selectable via checkbox 314 available from GUI 320 in application 300. Checkbox 314 may be available to user 50 from GUI 320 to allow user 50 to select to view comments 312 from user 44.

As discussed above, client electronic device 34 may be associated with user 50. In other words, user 50 may be a user of client electronic device 34. Further, client electronic device 28 may be associated with user 44. In other words, user 44 may be a user of client electronic device 50. Users 50 and 44 may be in a social network. One or more of users 44, 46, 48, and 50 may be friends or in social circles in a social network through a social networking application (e.g., application 300).

The selection (e.g., selection 310) to view the comments (e.g. comments 312) from the second user computing device (e.g., client electronic device 28 associated with user 44) may be a selection of a second user (e.g., user 44) associated with the second user computing device (e.g., client electronic device 28). For example, user 50 may select checkbox 314 via GUI 320 in order to select to view comments of user 44.

Figure 5:
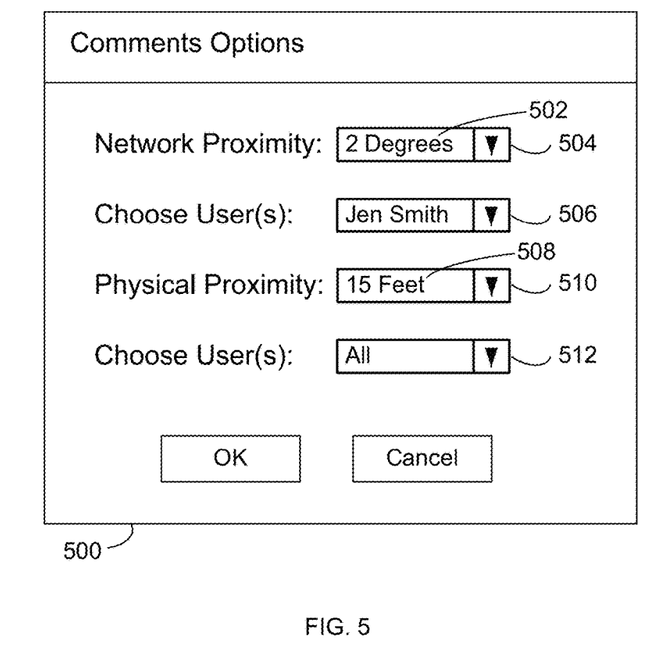
FIG. 5 depicts an example graphical user interface of one or more implementations of the present disclosure.

Referring now also to FIG. 5, the second user (e.g., user 44) may be (118) within an adjustable social network proximity (e.g., social network proximity 502) in relation to a first user (e.g., user 50) associated with the first user computing device (e.g., client electronic device 34). GUI 500 may be available from the social networking application (e.g., application 300). GUI 500 may be accessible in response to a user (e.g., user 50) selecting button 322 from GUI 320.

Social network proximity may refer to a number of degrees or social circles away from a user that another user is in a social network. For example, user 50 may have two direct connections or friends in a social network. User 50's two direct connections or friends may each have 2 direct connections or friends of their own, who are not direct connections or friends with user 50. User 50's two direct connections or friends may have a social network proximity of 1 degree in relation to user 50. Further, the two direct connections or friends of each of user 50's direct connections may have a social network proximity of 2 degrees in relation to user 50.

In an implementation, user 50 may have two friends in a social circle of user 50. User 50's two friends may each have three friends in their respective social circles. Those friends in user 50's direct social circle may have a social network proximity of 1 degree in relation to user 50. Further, the three friends in the respective social circles of each user 50's two direct friends may have a social network proximity of 2 degrees in relation to user 50.

Assume for illustrative purposes that user 50 wishes to view comments from users that have a social network proximity of 2 degrees in relation to user 50. User 50 may select button 322 from GUI 320 and in response, may view GUI 500, which may be rendered by application 300. User 50 may select a social network proximity of 2 degrees using dropdown box 504. User 50 may further wish to specify one or more users having a social network proximity of 2 degrees in relation user 50. As such, user 50 may select "Jen Smith" from dropdown menu 506. User 50 may then view comments from "Jen Smith" over video media content 308.

In an embodiment, comments may not be shared unless the user making the comments has opted into using the social network proximity feature of the present disclosure. In an embodiment, the social network proximity feature of the present disclosure may be active unless the user opts out.

In some embodiments, the second user computing device (e.g., client electronic device 28 associated with user 44) may be (120) within an adjustable physical proximity (e.g., physical proximity 508) in relation to a first user computing device (e.g., client electronic device 34 associated with user 50). Physical proximity may refer to a physical distance, e.g., a radius, away from a user that another user is in space. One or more computing devices (e.g., client electronic devices 28, 30, 32, 34) may be configured to determine a physical proximity of other computing devices in relation the one or more computing devices (e.g., client electronic devices 28, 30, 32, 34).

For example, user 50 may be on an airplane watching a movie. Further, user 50 may wish to receive comments of other users on the plane regarding the movie. User 50 may select a physical proximity (e.g., physical proximity 508) of 15 feet using dropdown box 510. User 50 may further wish to specify one or more users having a computing device within a physical proximity of 15 feet in relation user 50's computing device, or may wish to receive comments from all users having a computing device with a physical proximity of 15 feet in relation to user 50's computing device. As such, user 50 may select "All" from dropdown box 512. User 50 may then view comments from all users having computing devices within, e.g., a 15 foot radius of user 50's computing device, over the movie.

In some embodiments, VC process 10 may receive 122 a selection (e.g., selection 324) to not view comments (e.g., comments 312) from a third user computing device (e.g., client electronic device 30 associated with user 46). For example, user 50 may deselect checkbox 316 in order to make a selection (e.g., selection 324) not to view comments from user 46 over video media content 308.

Further, VC process 10 may prevent 124 transmission of one or more comments (e.g., comments 312) from the third user computing device (e.g., client electronic device 30 associated with user 46) to the first user computing device (e.g., client electronic device 34 associated with user 50). Prevention of transmission of the one or more comments (e.g., comments 312) may be based upon, at least in part, the selection (e.g., selection 324) not to view the comments (e.g., comments 312) from the third user computing device (e.g., client electronic device 30 associated with user 46). In other words, VC process 10 may prevent comments of user 46 from being displayed with video media content 308 for user 50.

In some embodiments, comments viewable over video media content may be restricted to comments from users in a social circle of a viewer. Further, comments viewable over video media content may be restricted to comments from users in a video chat with the viewer.

Further, in some embodiments VC process 10 may use a time in the video media content corresponding to when comments were entered by a user in order to overlay the comments such that they appear in the video media content at the time in the video media content that the comments were originally entered. In other words, VC process 10 may eliminate or minimize lag time for comments as they appear over the video media content. Additionally, VC process 10 may time shift comments from one or more users such that when they are played back at a later time, the comments appear in the video media content at the time in the video media content that they were originally entered.

It should be noted that while FIG. 3 may show comments 312 as being comments from only one user (e.g., user 44), this is for illustrative purposes only. In other words, users may select many other users whose comments they wish to view over the video media content. Comments of many users may then appear over the video media content.

In some embodiments, users may view television shows or live broadcast events over the internet in a video streaming or broadcasting application, or in a social networking application (e.g., application 300). Users that are friends and/or in social networks may view these shows at the same or similar times and may wish to view comments of others in their social network. Using one or more of the techniques and features described herein, VC process 10 may allow a user to view comments of one or more other users over television shows or live broadcast events being watched over the internet in the video streaming or broadcasting application, or in the social networking application.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

A number of embodiments and implementations have been described. Nevertheless, it will be understood that various modifications may be made. Accordingly, other embodiments and implementations are within the scope of the following claims. For example, the actions recited in the claims can be performed in a different order and still achieve desirable results.

What is claimed is:

1. A computer-implemented method, comprising:
    receiving, at a computing device associated with a viewing user, video media content, wherein the viewing user is a member of a social network;
    displaying, at the computing device, a graphical user interface (GUI) that includes a media display portion for the video media content and a comment display portion for comments received from one or more other users, wherein the GUI further includes at least one user selectable option to selectively display comments from the one or more other users;
    playing, at the computing device, the video media content; and
    receiving, at the computing device via the at least one user selectable option of the GUI, a first selection of a first set of the one or more other users who are members of the social network,
    wherein the first selection indicates a request of the viewing user to view comments associated with the first set of the one or more other users,
    wherein one or more of the comments associated with the first set of the one or more other users are displayed in the comment display portion of the GUI in response to receiving the first selection.

2. The computer-implemented method of claim 1, further comprising:
    receiving, at the computing device a request from the user selectable option of the GUI, a second selection of a second set of other users, wherein the second set of other users includes at least one of the one or more other users and the second selection indicates a request of the viewing user to not view comments associated with the second set of other users, wherein one or more comments associated with the video media content and from the second set of other users are not displayed.

3. The computer-implemented method of claim 1, wherein the first selection is received while the video media content is playing.

4. The computer-implemented method of claim 1, further comprising:
    displaying, at the computing device, a social network proximity option, wherein the social network proximity option indicates a social network proximity of a respective ones of the one or more other users with the viewing user in the social network.

5. The computer-implemented method of claim 1, further comprising displaying, at the computing device, a physical proximity option, wherein the physical proximity option indicates a geographic distance of the respective computer devices of the one or more other users from the computing device of the viewing user.

6. The computer-implemented method of claim 4, further comprising:

receiving, at the computing device, a third selection via the social network proximity option, the third selection being indicative of the user selecting the social network proximity option; and displaying, at the computing device, a list of the one or more other users matching the selected social network proximity option, wherein the first selection of the first set of the one or more other users is received from the user selecting the first set of the one or more other users from the list.

7. The computer-implemented method of claim 1, further comprising:

executing, at the computing device, a video chat application, wherein the GUI is associated with the video chat application;

receiving, at the computing device, one or more video streams associated with the one or more other users, respectively; and displaying, at the computing device, the one or more video streams and the video media content in the GUI concurrently.

8. The computer-implemented method of claim 1, wherein the comment display portion comprises an overlay of the media display portion associated with a captioning feature of a media player that is playing the video media content.

9. A computer program product residing on a nontransitory computer readable storage medium having a plurality of instructions stored thereon, which, when executed by a computing device having one or more processors and being associated with a viewing user, cause the computing device to perform operations comprising:

receiving video media content;

displaying a graphical user interface (GUI) that includes a media display portion for the video media content and a comment display portion for comments received from one or more other users, wherein the GUI further includes at least one user selectable option to selectively display comments from the one or more other users;

playing the video media content; and receiving, from the user via the user selectable option of the GUI, a first selection of a first set of the one or more other users who are members of a same social network of which the viewing user is a member, wherein the first selection indicates a request of the viewing user to view comments associated with the first set of the one or more other users, wherein one or more of the comments associated with the first set of the one or more other users are displayed in the comment display portion of the GUI in response to receiving the first selection.

10. The computer program product of claim 9, wherein the operations further comprise:

receiving, a request from the user selectable option of the GUI, a second selection of a particular set of other users, a second set of other users, wherein the second set of other users includes at least one of the one or more other users and the second selection indicates a request of the viewing user to not view comments associated with the second set of other users, wherein one or more comments associated with the video media content and from the second set of other users are not displayed.

11. The computer program product of claim 9, wherein the first selection is received while the video media content is playing.

12. The computer program product of claim 9, wherein the operations further comprise:

displaying a social network proximity option, wherein the social network proximity option indicates a social network proximity of a respective ones of the one or more other users with the viewing user in the social network.

13. The computer program product of claim 9, further comprising displaying, a physical proximity option, wherein the physical proximity option indicates a geographic distance of the respective computer devices of the one or more other users from the computing device of the viewing user.

14. The computer program product of claim 12, wherein the operations further comprise:

receiving a third selection via social network proximity option, the third selection being indicative of the user selecting the social; and displaying a list of one or more other users matching the selected social network proximity option, wherein the first selection of the first set of the one or more other users is received from the user selecting the first set of the one or more other users from the list.

15. The computer program product of claim 9, wherein the operations further comprise:

executing a video chat application, wherein the GUI is associated with the video chat application;

receiving one or more video streams associated with the one or more other users, respectively; and displaying the one or more video streams and the video media content in the GUI concurrently.

16. The computer program product of claim 9, wherein the comment display portion comprises an overlay of the media display portion associated with a captioning feature of a media player that is playing the video media content.

17. A computing device associated with a viewing user, comprising:

one or more processors; and a non-transitory computer readable storage medium having a plurality of instructions stored thereon, which, when executed by the computing device, cause the computing device to perform operations comprising:

receiving video media content;

displaying a graphical user interface (GUI) that includes a media display portion for the video media content and a comment display portion for comments received from one or more other users, wherein the GUI further includes at least one user selectable option to selectively display comments from the one or more other users;

playing the video media content; and receiving, from the user via the user selectable option of the GUI, a first selection of a first set of the one or more other users who are members of a same social network of which the viewing user is a member, wherein the first selection indicates a request of the viewing user to view comments associated with the first set of the one or more other users, wherein one or more of the comments associated with the first set of the one or more other users are displayed in the comment display portion of the GUI in response to receiving the first selection.

18. The computing device of claim 17, wherein the operations further comprise:

receiving, a request from the user selectable option of the GUI, a second selection of a set of other users, a second set of other users, wherein the second set of other users includes at least one of the one or more other users and the second selection indicates a request of the viewing user to not view comments associated with the second set of other users, wherein one or more comments associated with the video media content and from the second set of other users are not displayed.

19. The computing device of claim 17, wherein the first selection is received while the video media content is playing.

20. The computing device of claim 17, wherein the operations further comprise:
 displaying a social network proximity option, wherein the social network proximity option indicates a social network proximity of a respective ones of the one or more other users with the viewing user in the social network.

21. The computing device of claim 17, further comprising displaying, a physical proximity option, wherein the physical proximity option indicates a geographic distance of the respective computer devices of the one or more other users from the computing device of the viewing user.

22. The computing device of claim 20, wherein the operations further comprise:
 receiving a third selection via social network proximity option the third selection being indicative of the user selecting the social network proximity option; and
 displaying a list of one or more other users matching the selected social network proximity option,
 wherein the first selection of the first set of the one or more other users is received from the user selecting the first set of the one or more other users from the list.

23. The computing device of claim 17, wherein the operations further comprise:
 executing a video chat application, wherein the GUI is associated with the video chat application;
 receiving one or more video streams associated with the one or more other users, respectively; and
 displaying the one or more video streams and the video media content in the GUI concurrently.

24. The computing device of claim 17, wherein the comment display portion comprises an overlay of the media display portion associated with a captioning feature of a media player that is playing the video media content.

* * * * *